Aug. 14, 1945.  P. ORR  2,382,438
MULTIPLE CLUTCH ASSEMBLY
Original Filed Feb. 14, 1938   6 Sheets-Sheet 1

Fig. 1A.

Inventor:
Palmer Orr.
By: Edward P. Gritzbaugh

Aug. 14, 1945.   P. ORR   2,382,438
MULTIPLE CLUTCH ASSEMBLY
Original Filed Feb. 14, 1938   6 Sheets—Sheet 4

Aug. 14, 1945. P. ORR 2,382,438
MULTIPLE CLUTCH ASSEMBLY
Original Filed Feb. 14, 1938 6 Sheets-Sheet 5

Inventor:
Palmer Orr.
By Edward C. Fitzhugh
Atty.

Patented Aug. 14, 1945

2,382,438

UNITED STATES PATENT OFFICE 2,382,438

MULTIPLE CLUTCH ASSEMBLY

Palmer Orr, Muncie, Ind., assignor to Borg-Warner Corporation, Chicago, Ill., a corporation of Illinois Original application February 14, 1938, Serial No. 190,368, now Patent No. 2,282,591, dated May 12, 1942. Divided and this application March 18, 1942, Serial No. 435,179

8 Claims. (Cl. 192—48)

This invention relates to power transmitting mechanisms and particularly to a multiple clutch assembly which is adapted to provide a plurality of power transmitting paths under the control of a governor or at the will of the operator.

This application is a division of my prior application Serial No. 190,368, filed February 14, 1938, and issued on May 12, 1942, as Patent No. 2,282,591.

For purposes of illustration, this invention will be described with reference to a particular type of automotive speed ratio changing device since it is in the nature of an improvement thereof, but it is understood that the invention is not limited in its application to the particular device described.

There has been devised an automatic speed ratio changing device or transmission which provides three forward speeds and a reverse by means of gear trains adapted selectively to be connected to an engine through individual clutches or combinations of clutches, with one-way clutches in all but the highest ratio gear trains. A main speed responsive clutch is used through which all speeds are obtained, and additional fluid operated clutches, controlled by a governor, are used to drive the gear trains of lesser speed reduction ratio.

It is desirable in automotive transmissions to provide a means for positively locking the wheels of the vehicle to the engine at gear ratios less than unity to render the compression in the engine available for braking purposes. In the transmission mentioned above, such a means has not been provided.

An object of this invention is to provide a multiple clutch assembly for a power transmitting device which is adapted to lock a normally free-wheeling drive to the power source to provide a two-way drive between the power source and the load.

Another object is to provide a locking device for a fluid-operated multiple clutch assembly having a single source of fluid under pressure and wherein one of the clutches drives through a one-way clutch, said device being likewise adapted to be fluid-operated and in no way interfering with the normal operation of the transmission.

Another object is to provide a combination of fluid-operated friction clutches, one of which drives through a one-way device, and a positive clutch for rendering the one-way clutch ineffectual to break the drive, said positive clutch being likewise fluid-operated.

These and other objects of the invention will become apparent from the following detailed description when taken together with the accompanying drawings which form a part thereof, and in which.

In the form selected for illustration this invention comprises a fluid-operated jaw clutch which is adapted to lock the driven shaft of a transmission and one of the speed reduction ratio trains together around a free-wheeling or one-way clutch in said train. The movable element of the jaw clutch is in the form of a piston, and the fluid for operating the piston is controlled by a manually operated valve. The porting of the valve is so designed that the presence of the valve in the fluid system does not disturb the normal operation of the remaining valves in the system.

Before describing the operation of the novel locking means, it will be necessary to detail the operation of a transmission in which the locking means may be necessary or desirable. Accordingly, reference is now made to Figs. 1A, 1B, 2 and 3, wherein the details of such a transmission are shown.

The transmission is adapted to be inserted between a drive shaft 20 and a driven shaft 21, a portion of the latter shaft being included in the transmission and forming a part thereof. It is comprised of two main sections 22 and 23, section 22 being the main clutch section, and section 23 constituting the speed reducing section.

Main clutch section 22 is comprised of a flywheel 24 which is bolted to a flange 25 on drive shaft 20, and a clutch cover 26. Within the space formed by flywheel 24 and clutch cover 26 is a bi-partite drum 27 formed by telescoping and welding together flanged discs 28 and 29. Drum 27 and clutch cover 26 are adapted to be engaged frictionally to constitute a clutch 30. The means for engaging said drum and clutch cover comprise wedge-shaped weights 30', which are slidable radially outward on pressure plate 31 under the action of centrifugal force, and corresponding blocks 32 rigidly secured to clutch cover 26. It is apparent that outward radial movement of weights 30' will cause pressure plate 31 to move to the left (Fig. 1A) thereby compressing drum 27 between the pressure plate and flywheel 24. Suitable friction facings 33 and 34 may be used on drum 27 to prevent undue slipping.

Drum 27 is rigidly connected to a flanged sleeve 36 which is splined to a second sleeve 37 one portion 38 of which is toothed to form the first gear of the first gear reduction, or lowest speed, train.

Within drum 27 are two multiple disc clutches 39 and 40, each of which has a set of plates 41 and 42 respectively mounted to rotate with a web 43. Said web 43 is connected through vibration dampening springs 57 to a sleeve 58 which is splined to a long shaft 59 extending through both sections of the transmission. Plates 44 of clutch 39, which cooperate with plates 41, are non-rotatably mounted on an annulus 45 connected through a one-way clutch 46 to a collar 47 which is splined to one end of a sleeve 48, the opposite end 49 (Fig. 1B) of sleeve 48 being toothed to form a gear for the second speed gear reduction train. Plates 50 of clutch 40, which cooperate with plates 42, are non-rotatably mounted on an annulus 51 splined to a flanged disc 52, the latter being rigidly secured to disc 28 of drum 27.

Clutches 39 and 40 are selectively operated by fluid pressure acting upon diaphragms 53 and 54, which tend to urge plates 55 and 56 outward from web 43 to compress the plates of the clutches and thereby to operate said clutches.

It is apparent thus far that main clutch 22 rotates gear 38 of the low speed train, clutch 39 rotates second speed gear 49 and clutch 40 rotates shaft 59. The various gear trains which cause driven shaft 21 to rotate at three different speeds relative to drive shaft 20 will now be described.

Figure 1A:
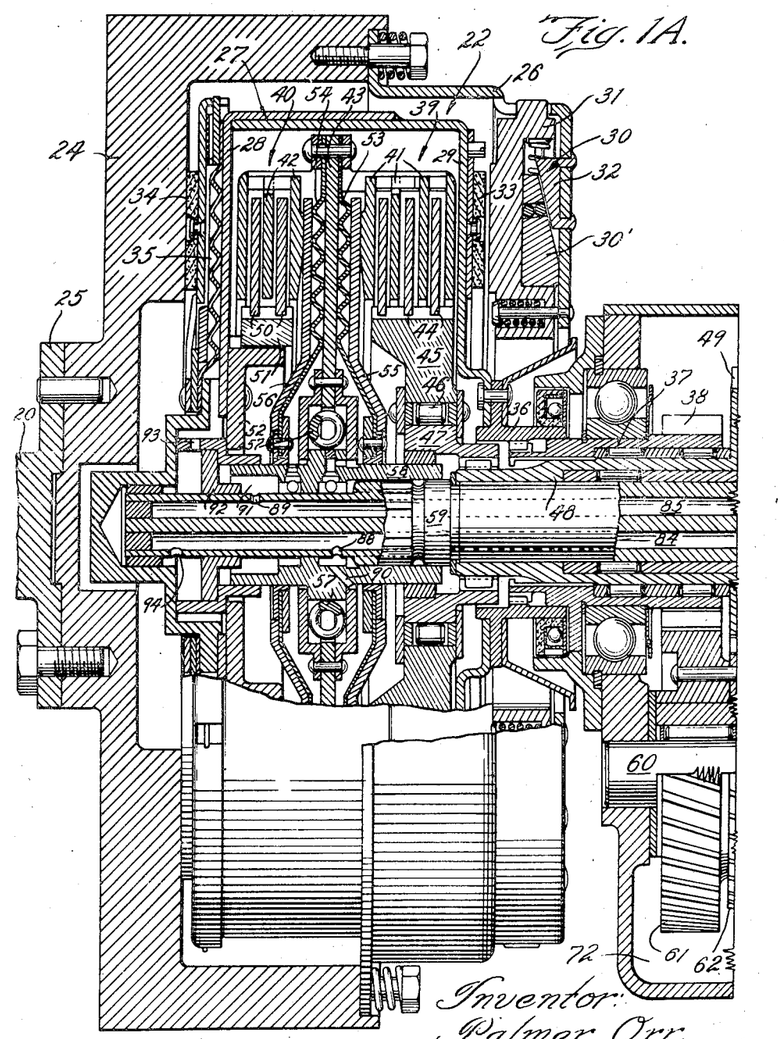
Fig. 1A is a side elevation in section of a portion of a fluid operated transmission.
Figures 1B, 8:
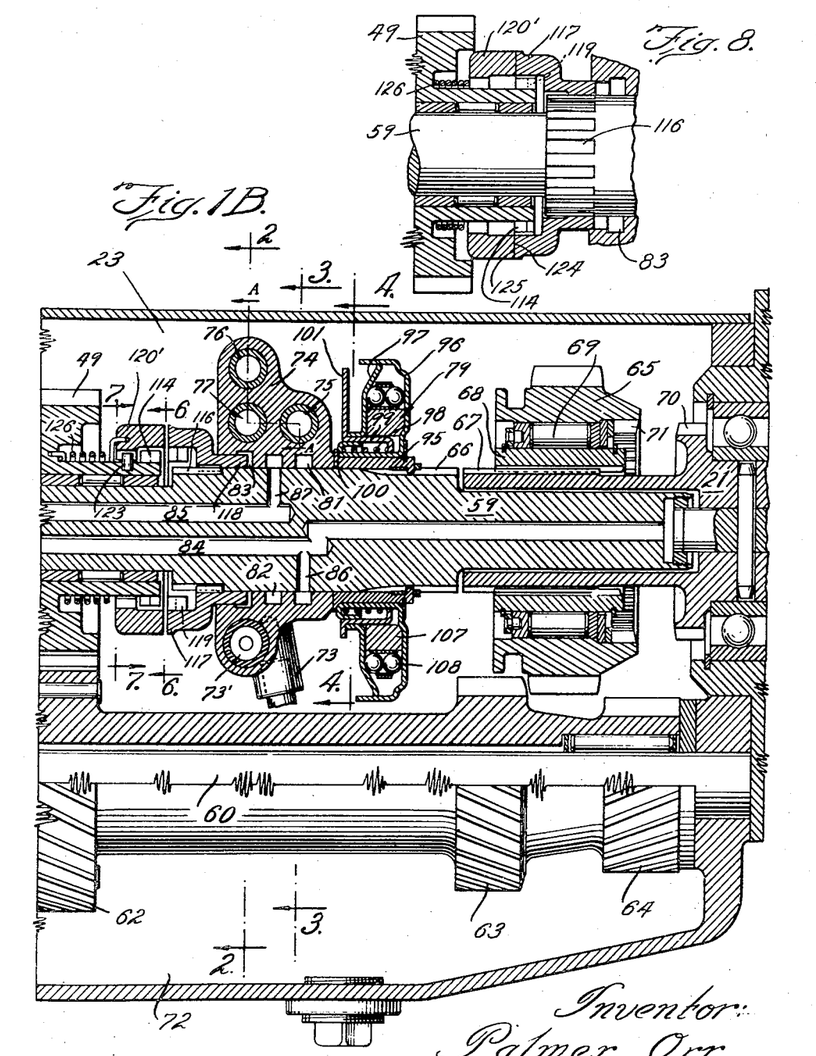
Fig. 1B is a side elevation in section of the remaining portion of the fluid-operated transmission of Fig. 1A, said Figs. 1A and 1B being drawn to be placed side by side and read together.
Fig. 8 is a side elevation in section of the locking means.

Referring particularly to Fig. 1B, speed reduction section 23 is comprised of a plurality of gears mounted on long shaft 59 and adapted to cooperate with gears mounted on a countershaft 60. Said countershaft gears are comprised of a gear 61 which is constantly in mesh with gear 38, a gear 62 constantly in mesh with gear 49, and gears 63 and 64, selectively meshable with a gear 65 concentric with shaft 59, gear 64 being indirectly meshable with gear 65 through an idler gear (not shown) to provide a reverse drive. Gears 62, 63, and 64 may be members of a gear cluster so as to rotate together, and gear 61 may be secured to gear 62 for rotation therewith.

Shaft 59 is piloted in shaft 21 and both shafts are provided with external splines 66 and 67 respectively which are adapted to cooperate with an internally splined collar 68 for locking said shafts together. Gear 65 is mounted on collar 68 and is driven therefrom through a one-way clutch 69. Shaft 21 is also provided with a toothed flange 70 forming one element of a jaw clutch, and gear 65 is toothed internally at 71 to form the mating member of said jaw clutch. Suitable means (not shown) may be used to shift gear 65 to any one of three positions, the first of which causes the gear to mesh with gear 63 on the countershaft and to lock shafts 59 and 21 through splines 66, 67 and 68, the second causes gear 65 to be out of mesh with gears 63 and the idler connected to gear 64 to provide a neutral position, and the third causes gear 65 to mesh with the reverse idler and also connects said gear 65 to shaft 21 directly through jaw clutch elements 70 and 71 for a positive reverse drive.

The various power transmitting trains provided by the transmission thus far described can now be traced. Assuming that gear 65 is in position to mesh with gear 63, that is, in forward driving position, and that shaft 20 and its associated flywheel 24 and clutch cover 26 are rotated sufficiently rapidly to cause clutch 30 to be engaged, the low speed train comprises clutch cover 26, drum 27, splined sleeves 36 and 37, gear 38, countershaft gears 61, and 63, gear 65, one-way clutch 69, collar 68 and shaft 21. For second speed it is necessary that clutch 39 shall be operated in addition to speed responsive clutch 30, and assuming that these conditions obtain, the power for second speed is transmitted from flywheel 24 through clutch 30, splined sleeves 36 and 37, gear 38, countershaft gears 61 and 62, gear 49, collar 47, one-way clutch 46, annulus 45, clutch 39, web 43, vibration dampener 57, sleeve 58, shaft 59, and jaw clutch elements 66, 67 and 68 to shaft 21. Collar 68 will overrun gear 65 through clutch 69 when second speed is made effective. For high speed, i. e., direct drive, it is necessary that clutch 40 be made operative. The high speed train is then traceable from flywheel 24 through clutch 30 as before, drum 27, annulus 52, clutch 40, web 43, vibration dampener 57, sleeve 58, shaft 59, and jaw clutch elements 66, 67, 68 to shaft 21. Since web 43 will rotate faster than collar 47 of the second speed drive, clutch 46 will overrun as well as clutch 69 in high speed. To establish reverse, gear 65 is moved to the right (Fig. 1B) until jaw clutch elements 70 and 71 are engaged and gear 65 is connected to gear 64 through the reverse idler. The power is then transmitted through the same elements as for low speed up to and including gear 64 and then through the idler, the gear 65, jaw clutch elements 70 and 71 to shaft 21.

Thus, for the successful operation of the transmission device, it is necessary to operate three clutches, the first of which is mechanical and speed-responsive, and the remaining two of which are fluid operated. The fluid system from operating the clutches will now be described.

Figure 2:
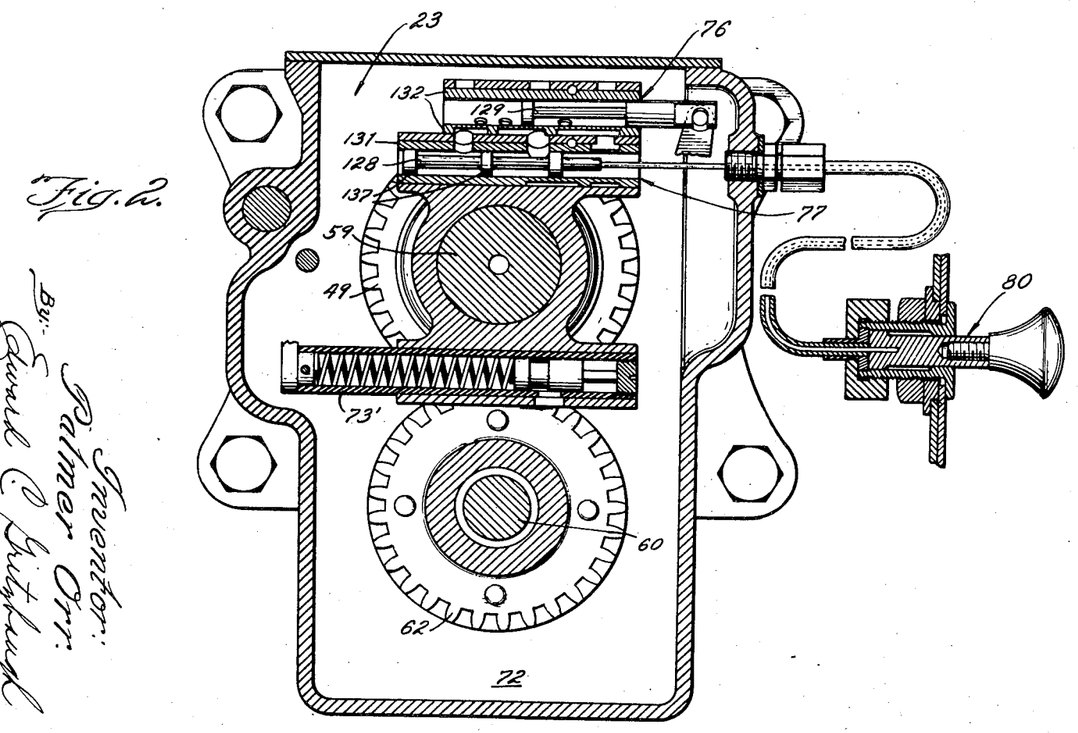
Fig. 2 is a section taken through certain of the valves of Fig. 1B and showing the control for one of said valves.

The fluid used may be any one of the available oils such as are commonly used to lubricate transmissions, and is supplied from a reservoir 72 at the bottom of section 23. A pump (not shown) draws the oil from reservoir 72 when the transmission is in operation, and forces it through a conduit 73 through a pressure regulating valve 73' to a valve block 74 in which are located three piston valves, 75, 76 and 77. Valve 75 is controlled by a manual control designated generally by reference character 78 (Fig. 3); valve 76 is controlled by a governor designated generally by reference character 79; and valve 77, which is the valve by which the transmission is locked up in second, is controlled by a second manual control 80 (Fig. 2).

The three valves 75, 76, and 77 are so interconnected through portings that governor valve 76 normally controls the flow of fluid from the reservoir 72, but control may be taken from governor valve 76 by manually controlled valve 75, and the transmission may be locked in second through valve 77. The portings will be described in detail hereinafter.

Valve block 74 is provided with three grooves 81, 82 and 83 which communicate with valves 75, 76 and 77 respectively. Shaft 59 is bored axially at 84 and 85 to provide conduits therethrough, and radially at 86 and 87 to connect conduits 84 and 85 with grooves 81 and 82, respectively. Near the opposite end of shaft 59 other radial bores 88 and 89 connect conduits 84 and 85 to passageways 90 and 91, which are traceable to the web side of clutch operating diaphragms 53 and 54.

Thus it will be apparent that when the valves in valve block 74 are so positioned as to admit fluid under pressure into groove 81, the fluid pressure will be transmitted through the several interconnected bores to expand diaphragm 53 and thereby operate second speed clutch 39. Similarly, when the valves are so positioned as to admit fluid under pressure to groove 82, the pressure will be transmitted through the bores connected thereto to expand diaphragm 54 and operate high speed, or direct drive clutch 40. The pressure in passageway 91 is also transmitted to the back of a concentric piston 92, which thereupon moves to the left to expose port 93 communicating with the auxiliary diaphragm 35 to increase the normal pressure on friction surface 34 and insure rotation of drum 21 with flywheel 24 without slippage. Said piston 92 is returned to its right-hand position by pressure in bore 84, which is transmitted through a radial bore 94 to the left of piston 92 and maintains pressure behind web 35 when the second speed train is operative.

Figure 4:
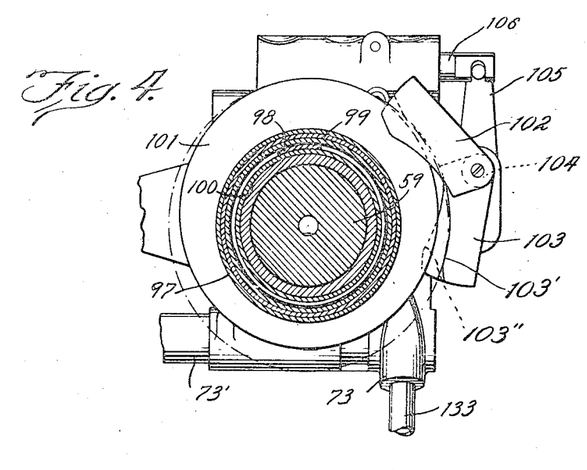
Fig. 4 shows the means by which the governor controls still another of the valves.
Figure 5:
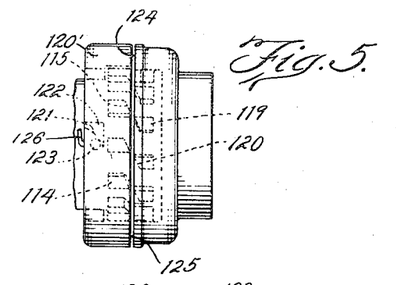
Fig. 5 is an elevation of the novel locking means.
Figure 6:
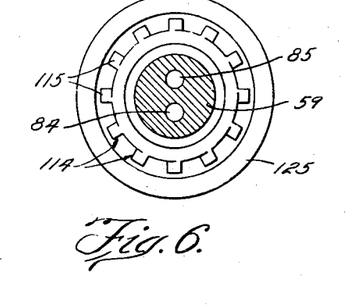
Figs. 6 and 7 are end elevations in section of different parts of the locking means of Fig. 5.
Figure 7:
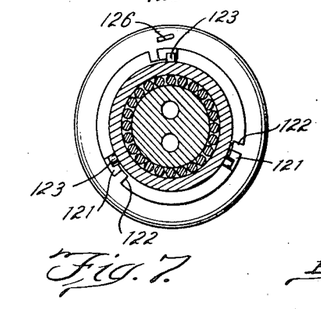

Governor 79 (Figs. 1B and 4) is comprised of a collar 95 splined to shaft 59 to which collar is fixed a housing 96 having an open side. An axially movable cam surface 97 is mounted in the open side and is normally biased to the right (Fig. 1B) by the action of a coil spring 98 which is compressed between a flange on a collar 99 and an in-turned flange 100 on housing 96. Collar 99 is provided with an eccentric disc 101 which cooperates with spaced pivoted arms 102 and 103. Said spaced arms are non-rotatably secured to a shaft 104 to the opposite end of which is secured an arm 105 connected by a pin and slot connection to the governor valve stem 106. Included between housing 96 and cam surface 97 is a plurality of weights 107 which contact housing 96 and surface 97 through anti-friction balls 108.

Rotation of the governor housing causes weights 107 to fly outward, thereby moving camming surface 97 and its associated collar 99 and eccentric disc 101 to the left (Fig. 1B). In its motion to the left, disc 101 encounters arm 103 and rotates its counter-clockwise (Fig. 4), thereby causing valve stem 106 to move to the left. This rotation occurs in two stages corresponding to the second and third speed positions of the governor valve. The degree of movement is determined by stepped camming surfaces 103' and 103" on arm 103. The return of valve 76 to low speed position is accomplished through arm 102 which is rotated clockwise by eccentric 101 in two stages corresponding to second and low speeds by the return movement of the eccentric disc in response to deceleration of the vehicle.

Figure 3:
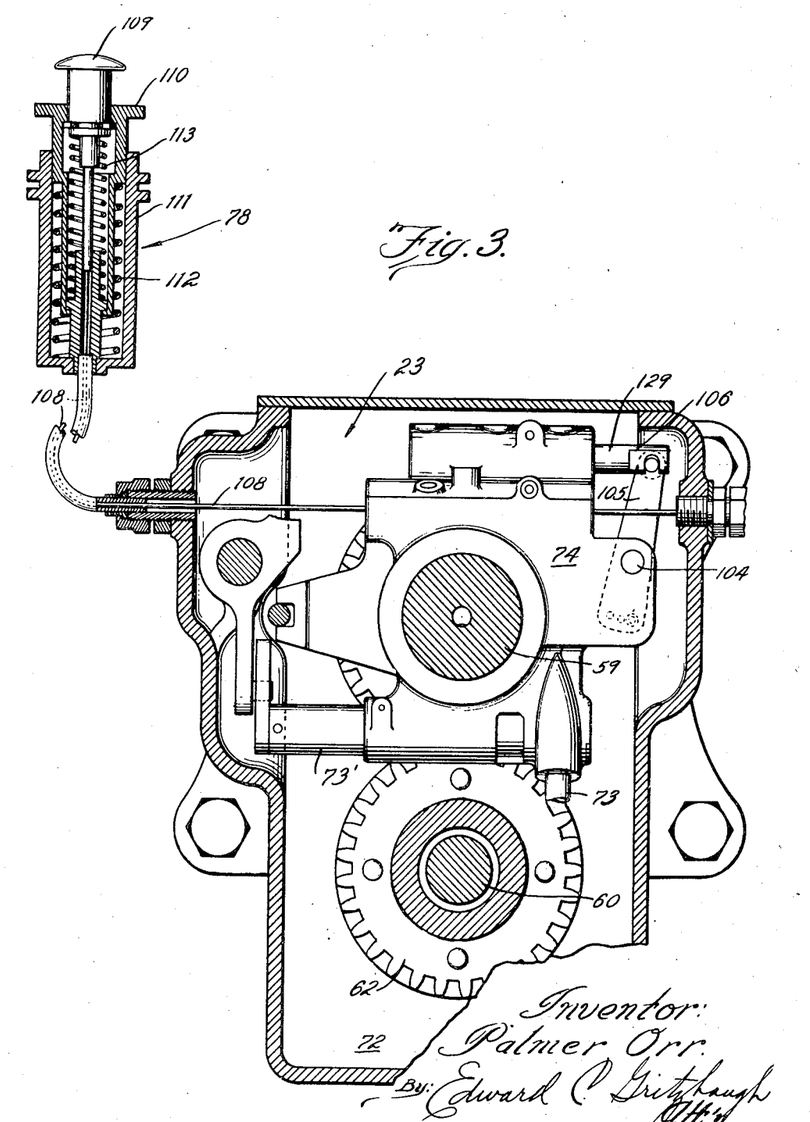
Fig. 3 is a section taken through the transmission near the governor valve of Fig. 1B showing the control for another of the valves.

The manual control 78 for valve 75 is shown in Fig. 3, and comprises a Bowden wire 108 secured to a button 109 in a housing 110. Said housing 110 is movable in the direction of motion of button 109 within a second housing 111, which is suitably secured to some part of the car such as the dash or floor-board. The valve has three positions, high, second and low, with high as the normal position. Pushing button 109 until it contacts housing 110 establishes the position for second speed and continuing the motion of the button until the button and housing 110 are telescoped in housing 111, establishes the position for low speed. Suitable coil springs 112 and 113 return housing 110 and then button 109 to their normal positions.

The description thus far has been concerned with the means for obtaining the various speed reductions and the controls by which the reductions are predetermined. It will be recalled that while in second speed, sleeve 48 and shaft 59 rotate at the same speed since clutch 39 is operated and thereby couples web 43 to sleeve 48. It will be recalled further, that should shaft 59 rotate faster than sleeve 48, as for example when in high, or when coasting, the drive through second speed is broken by overrunning clutch 46. To lock the transmission in second, therefore, it is only necessary to couple shaft 59 and sleeve 48 through a positive two-way clutch. Such a clutch will now be described.

Sleeve 48 is extended to the right (Fig. 1B) of gear 49 and has formed on its end a series of external teeth 114 having chamfered ends 115. The adjacent portion of shaft 59 has external splines 116, and a bell-shaped collar 117 is internally splined to lock non-rotatively on splines 116, but to permit relative axial movement with respect thereto. The end 118 of collar 117 is accurately machined to fit into valve block 74 and to extend into groove 83 therein, thus to form an axially movable piston. Within the belled portion of collar 117 are internal teeth 119 which are likewise chamfered at their ends 120. Teeth 114 and 119 form two elements of a Maybach type of positive clutch, the chamfered ends of the teeth rendering engagement of the teeth difficult, if not impossible, until the speeds of both elements are the same.

To eliminate tooth clash between teeth 114 and 119, a blocker is used. In the form illustrated, the blocker comprises a ring 120' having camming surfaces 121 formed on spaced internal projections 122, said camming surfaces 121 cooperating with pins 123 extending radially from sleeve 48. A friction surface 124 on bell-shaped collar 117 cooperates with an opposed friction surface 125 on ring 120', and a suitable spring 126 urges ring 120' to the right (Fig. 1B) to engage said friction surfaces.

When it is desired to lock the transmission in second speed, valve 77 is operated to admit oil under pressure behind piston 118, thereby moving collar 117 against ring 120. Friction surfaces 124 and 125 will thereupon engage and tend to rotate ring 120' relative to sleeve 48. Such relative rotation will cause cam surface 121 to move along pin 123 and thereby to resist the leftward movement of collar 117. This resistance will persist until the speed of sleeve 48 becomes greater than that of shaft 59, as for example, when the accelerator is momentarily depressed, whereupon teeth 119 will engage smoothly with teeth 114 and the transmission will be locked in second speed as shown in Fig. 8. The teeth will remain locked as long as there is pressure behind piston 118. Release of this pressure by the operation of valve 77 will permit spring 126 to return collar 117 to its non-engaged position.

It is apparent that for the successful operation of the transmission in accordance with the objects to be attained thereby it is necessary first, that the manually controlled valve and the second speed lock up valve do not interfere with the normal operation of the governor valve, second, that the manually controlled valve take over the control of the transmission from the governor valve whenever necessary, and third, that the second speed lock-up valve be operative whenever desired, i. e., whenever the transmission is conditioned for second or high speed. The means by which these conditions are satisfied in the present invention are shown in detail in Figs. 9 to 18 inclusive, to which attention is now directed.

The three valves 75, 77 and 76 are shown in Figs. 9 to 18 inclusive with valve block 74 sectioned along line A—A of Fig. 1B to show the inter-connection between the valves. Each valve is comprised of a piston 127, 128 and 129, respectively, and a sleeve 130, 131, 132, press-fitted into bores in valve block 74. Said block 74 is provided with an intake port 133 (shown only in part) and outlet ports 134, 135 and 136 which communicate with grooves 82, 81 and 83, respectively and thence, with the high speed and second speed clutches and piston 118 of the second speed lock-up mechanism. The sleeves 130, 131 and 132 are provided with ports which intercommunicate, as shown, with the portions of pistons 127, 128 and 129 included between lands 137 on the pistons to form passages for the oil. For ease in tracing the course of the oil through the valves, the paths in each case are indicated with arrows.

Figure 9:
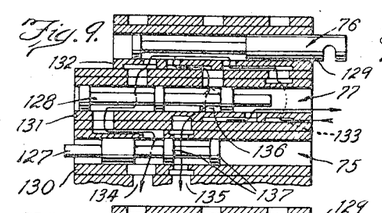
Figs. 9 to 18 inclusive are developed sections through the valves showing the paths of the fluid for various settings of the valves.

In Fig. 9 the valves are shown positioned for normal high gear operation. In this position pump pressure is fed to both the second and third speed clutches as indicated, the governor valve being in its high speed position, and both manually operated valve 75 and lock valve 77 are inoperative. Low speed and second speed gear trains are free wheeling and the car can coast against the engine in high.

Under this condition the driver may depress the manually operated button 109 to get into second gear free wheeling, or he may depress button 109 and subsequently actuate lock valve 77, or he may actuate lock valve 77 only.

Figure 10:
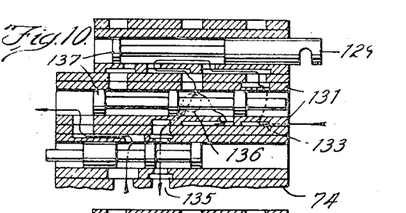

In Fig. 10 the transmission is locked up in second with manually operated valve 75 in high speed position. Oil under pressure is fed to the second speed oil clutch and to the second speed lock piston 118. It will be noted that the high speed oil clutch is bled at the left side of the lock valve as shown. The high speed oil clutch being thus disengaged and the pump pressure tending to force teeth 119 into engagement with teeth 114, second speed drive will be taken on second speed free wheel clutch 46 and the second speed coast load will be taken against the flat side of teeth 119.

In coming to this particular position from normal high gear operation, the driver has operated lock valve 77 only and may or may not have opened the throttle at the instant of lock valve operation. High speed clutch 40 will be vented as shown, and should the throttle remain closed, teeth 119 will tend to move into engagement with teeth 114, since shaft 59 always turns faster than sleeve 48 when in third or high speed, or when the throttle is closed and the car is tending to freewheel in second. To allow teeth 119 to engage fully, it is necessary for the driver to open the throttle, thereby taking up second speed drive on the freewheeling clutch 46 and synchronizing shaft 59 and sleeve 48, after which the throttle may be closed to allow the car to coast against the engine. Upon such closure of the throttle, chamfers 115 and 120 slide relative to one another until the teeth engage and full locking takes place.

To return to high speed, it is necessary that the driver again open the throttle, taking up the drive on the second speed freewheel clutch, and then push lock valve 77 to its inoperative position. If driving torque is maintained on the second speed freewheel clutch, belled sleeve 117 will automatically be disengaged by spring 126 and subsequent engagement of the high speed oil clutch 40 will bring the transmission into normal high gear.

Figures 11, 12, 13, 14, 15, 16:
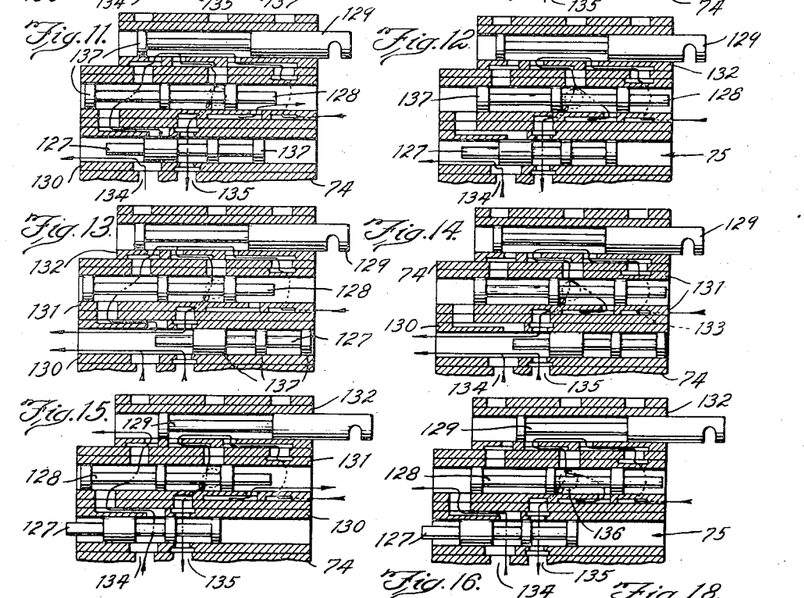

Fig. 11 shows governor valve 76 in high speed position, lock valve 77 in inoperative position and manually operable valve 75 in second speed position, i. e., button 109 is depressed to its first position to establish freewheeling second speed. Pump pressure is thus admitted to second speed clutch 39 as shown and the left land on piston 127 acts as a stop, dead-ending the fluid pressure so that it cannot be admitted to high speed clutch 40, or escape and allow the pump pressure to drop. Any fluid previously contained in high speed clutch 40 or the various bores and passageways leading to it is vented at the left end of valve 75 as shown. Under these conditions the car will freewheel when the throttle is closed, and the engine will drive the car in second speed through freewheel clutch 46 when the throttle is open.

If desired, the driver may pull out lock button 80 and thereby move lock valve 77 toward the right to establish subsequent second speed lock-up.

With the valves as shown in Fig. 11, it will be observed that any leakage tending to accumulate behind lock piston 128 is vented to the right of lock valve 77, thereby allowing spring 126 to keep the teeth fully separated and positively preventing contact of the teeth until the driver acts definitely to lock up the transmission in second speed.

Fig. 12 shows the second speed lock valve operated and the manually operated valve in second speed position. In this combination, oil under pressure is forced behind bellows 53 to operate second speed clutch 39 and into groove 83 behind the lock-up piston 118. Oil from high speed clutch 40 and its associated channels escapes at the left end of manually operated valve 75 as shown. With this combination, the throttle manipulation and action of the chamfered portions 115 and 120 on teeth 114 and 119 will be as described in connection with Fig. 10.

In Fig. 13, the governor valve 76 is in high speed position, lock valve 77 is inoperative, and manually operated valve 75 is in its low speed position. Oil under pressure thus passes around governor valve 76 in the usual manner, but escapes at the left end of valve 75 and the oil pressure, therefore, drops substantially to zero. Under such conditions, both second and high speed oil clutches 39 and 40 respectively, are also vented at the left of valve 75. Clutches 39 and 40 are free of pressure, since they are entirely cut off from the pump and drive is taken through speed responsive clutch 30 and the low speed transmission gear train. Low speed is capable of free wheeling at all times. It might be mentioned that since governor valve 76 is in high and the car speed must, therefore, be above 10 or 11 miles per hour, this combination will seldom if ever, exist.

Passing now to Fig. 14, which represents an extension of valve combination of Fig. 13, the lock valve 77 is operated, and valves 75 and 76 remain as in Fig. 13. It is evident that even though a channel is now open to groove 83 behind second speed lock piston 118, the escape of pump fluid at the left of manually operated valve 75 will reduce the pressure substantially to zero and the pressure built up behind lock piston 118 will be insufficient to overcome the resistance of spring 126. Teeth 114 and 119, therefore, cannot engage. Second and high speed clutches 39 and 40 are vented at the left of valve 75 as in Fig. 13, and the drive to the low speed train is taken from speed responsive clutch 30.

Fig. 15 shows lock valve 77 positioned for free wheeling second speed with manually operated valve 75 set for high speed. This combination and those of Figs. 16, 17 and 18 show the governor valve 76 in its second speed position, whereas the combinations shown in Figs. 9 to 14 inclusive show the governor valve 76 in high.

It will be noted that in Fig. 15 oil under pressure is admitted to second speed clutch 39 only, and that high speed clutch 40 is vented at the left of the governor valve as shown. As in foregoing valve combinations any leakage which may tend to accumulate behind lock piston 118 escapes at the right end of the lock valve and pressure, therefore, cannot be built up to overcome spring 126. With open throttle, drive will be taken through the second speed freewheel clutch 46, while with closed throttle, the car will freewheel.

In Fig. 16, the second speed is locked up and manually operated valve 75 is in high speed position. This combination follows that of Fig. 15, in that the driver has pulled out button 90 on the instrument panel, thereby moving lock valve 77 to its operative position. Pressure is maintained on the second speed clutch 39 and oil under pressure is also admitted behind lock piston 118. High speed oil clutch 40 is vented to the left of lock valve 77. If the throttle is closed, teeth 114 and 119 will tend to contact on their chamfers 115 and 120, but will be prevented from doing so by balk ring 120' continually while the car is freewheeling. However, if the throttle is opened, the engine will drive the car through the second speed freewheel clutch 46 and teeth 119 will move into complete engagement with teeth 114. After such engagement, the car may be allowed to brake against the engine merely by closing the throttle.

Figure 17:
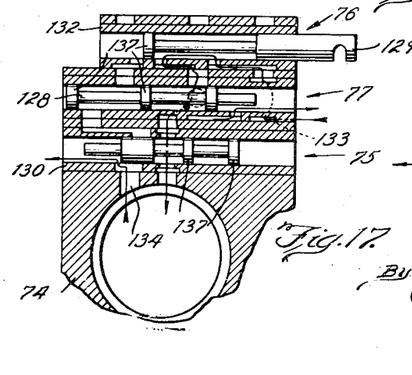
Figure 18:
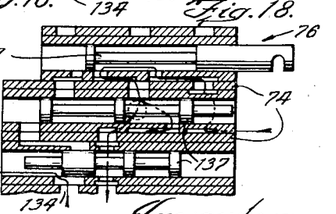

Fig. 17 shows the condition for freewheeling second speed with valve 75 in second. The path of oil under pressure flowing through the valves to the second speed clutch 39 is clearly indicated, while oil from high speed clutch 40 escapes at the left end of manual valve 75 as in Figs. 11, 12, 13 and 14. It will be noted that any leakage tending to accumulate behind lock piston 118 is vented at the right of lock valve 77 so that spring 126 keeps teeth 114 and 119 separated at all times with the combination shown in Fig. 17. Said combination may follow that of Fig. 15, in that the driver has partly depressed button 109, bringing manual valve 75 to second speed position, although such position has no effect on the oil clutches, since the governor valve 76 is already in second speed position.

The last figure (Fig. 18) shows the condition for second speed lock-up with the manual control in second speed. Pressure is maintained in the channels leading to second speed clutch 39, while oil is admitted to groove 83 behind lock piston 118. High speed clutch 40 is vented at the left of manual valve 75.

Assuming that governor valve 76 shown in Fig. 18 were in the second speed position and that button 109 were released by the driver, thereby allowing valve 75 to move to the left, high speed would still be inoperative until the driver had pushed lock valve 77 to its inoperative position and governor valve 76 had also moved into high. Conversely, were manual valve 75 maintained in the position shown in Fig. 18, and were governor valve 76 moved toward the left, high speed would not become operative and the combination would then be as shown in Fig. 12.

The valve positions shown in Figs. 9 to 18 inclusive do not represent all possible positions. However, combination other than those illustrated may be readily deduced.

It is important to note that if the car is in second speed lock-up and is allowed to coast to a stop, second speed clutch 39 will release automatically when governor valve 76 moves to its low speed position, and since pressure behind lock piston 118 then drops to zero, teeth 114 and 119 will thereupon release automatically, so that no trouble is encountered by the driver in bringing the car to a stop. Application of pressure to the brake pedal is the only operation required in such case.

Should the driver, with the car in low speed, open the throttle without moving lock valve 77 to its inoperative position, belled collar 117 could not move toward ring 120 as long as governor valve 76 remained in low speed position. Upon movement of governor valve 76 to second, however, belled collar 117 would be urged forward by oil under pressure. Teeth 114 and 119 would be prevented from ratcheting on chamfers 115 and 120 by ring 120' until second speed clutch 39 became fully engaged and gear 49 and shaft 59 were rotating at the same speed. Synchronism of shaft 59 and gear 49 would allow teeth 114 and 119 to engage fully, and upon a subsequent closing of the throttle, the car would coast against the engine in second.

It is understood that the foregoing description is merely illustrative of a preferred embodiment of the invention and that the scope of the invention, therefore, is not to be limited thereto, but is to be determined by the appended claims.

I claim:

1. A multiple clutch assembly comprising drive and driven shafts arranged concentrically, a friction clutch and a one-way clutch connected in series and adapted to effect a connection between adjacent ends of the drive and driven shafts, and a two-way clutch positioned at the opposite end of the drive shaft and adapted to effect a connection between the said shafts when the one-way clutch is ineffective to transmit the drive.

2. A multiple clutch assembly comprising an input shaft, means located intermediate the ends thereof for driving the shaft, an output shaft adapted to receive the drive from the input shaft, a friction clutch and a one-way clutch connected in series and adapted to connect adjacent ends of the input and output shafts to transmit the drive to the output shaft, and a two-way clutch positioned at the opposite end of the drive shaft for connecting the input and output shafts when the one-way clutch is ineffective to transmit the drive.

3. A multiple clutch assembly as described in claim 2, means being automatically operable above a predetermined speed of the output shaft for operating said friction clutch, and manually controlled means for operating said two-way clutch above the same predetermined speed whereby to maintain at will the same relationship between the shafts when the one-way clutch ceases to transmit the drive between the shafts.

4. A multiple clutch assembly comprising input and output shafts arranged concentrically, a friction clutch and a one-way clutch connected in series and adapted to connect adjacent ends of the input and output shafts, a two-way clutch adapted to effect a connection between the said shafts, means for automatically engaging the friction clutch above a predetermined speed of rotation of the output shaft, manually controlled means for rendering the two-way clutch operative, and means controlled by the automatic means for disengaging the two-way clutch when the friction clutch is disengaged.

5. A multiple clutch assembly comprising input and output shafts arranged concentrically, a friction clutch and a one-way clutch connected in series and adapted to connect adjacent ends of the input and output shafts, a two-way clutch adapted to effect a connection between said shafts, fluid means including a valve operable in response to the speed of the output shaft for effecting the engagement of the friction clutch, and fluid means including a manually operable valve for rendering the two-way clutch operative, said manually operable valve being hydraulically in series with the speed responsive valve so that the two-way clutch is disengaged when the friction clutch is disengaged.

6. A multiple clutch assembly as described in claim 5, said two-way clutch being a self-synchronizing jaw clutch, and means for preventing engagement of the jaw clutch until approximate synchronism is reached.

7. A multiple clutch assembly as described in claim 5, and a second manually controlled valve for overruling the automatically controlled valve and the manually controlled valve for the two-way clutch.

8. A multiple clutch assembly comprising a hollow input shaft, an output shaft passing through the input shaft and adapted to receive the drive therefrom, a friction clutch and a one-way clutch in series for transmitting the drive from one end of the input shaft to the output shaft and a two-way clutch for bypassing the friction clutch and one-way clutch, said two-way clutch being adapted to connect the opposite end of the input shaft to the output shaft.

PALMER ORR.